United States Patent
Last

(10) Patent No.: US 6,588,291 B2
(45) Date of Patent: Jul. 8, 2003

(54) METHOD FOR ELECTROHYDRAULICALLY CONTROLLING A MOTOR VEHICLE TRANSMISSION AND ELECTROHYDRAULIC CONTROLLER FOR A MOTOR VEHICLE TRANSMISSION

(75) Inventor: Bernd Last, Donaustauf (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/067,177

(22) Filed: Feb. 4, 2002

(65) Prior Publication Data

US 2002/0107108 A1 Aug. 8, 2002

(30) Foreign Application Priority Data

Feb. 2, 2001 (DE) .......................... 101 04 706

(51) Int. Cl.[7] ............................... F16H 59/00
(52) U.S. Cl. ................... 74/337; 477/163; 475/125
(58) Field of Search ................ 475/125; 477/163; 74/337

(56) References Cited

U.S. PATENT DOCUMENTS 4,388,844 A * 6/1983 Arai et al. ................. 477/163
4,949,595 A * 8/1990 Shimanaka ................. 477/163
4,998,451 A * 3/1991 Sano ........................ 477/163
5,492,508 A * 2/1996 Tsukamoto et al. ......... 475/125

FOREIGN PATENT DOCUMENTS

DE    199 04 920 A1    8/2000

* cited by examiner

Primary Examiner—Dirk Wright
(74) Attorney, Agent, or Firm—Laurence A. Greenberg; Werner H. Stemer; Gregory L. Mayback

(57) ABSTRACT

A control current is converted into an activation pressure for a transmission actuator by a pressure regulating valve. Both a control current at a given time and the activation pressure at the given time are fed back to a regulator. A setpoint value for the activation pressure in a partial range of a torque to be transmitted is converted by the regulator into the control current in dependence on the control current at the given time and otherwise as a function of the activation pressure at a given time. The current measuring device for determining the control current at the given time is adjusted here in such a way that a high resolution is obtained in the partial range.

6 Claims, 1 Drawing Sheet

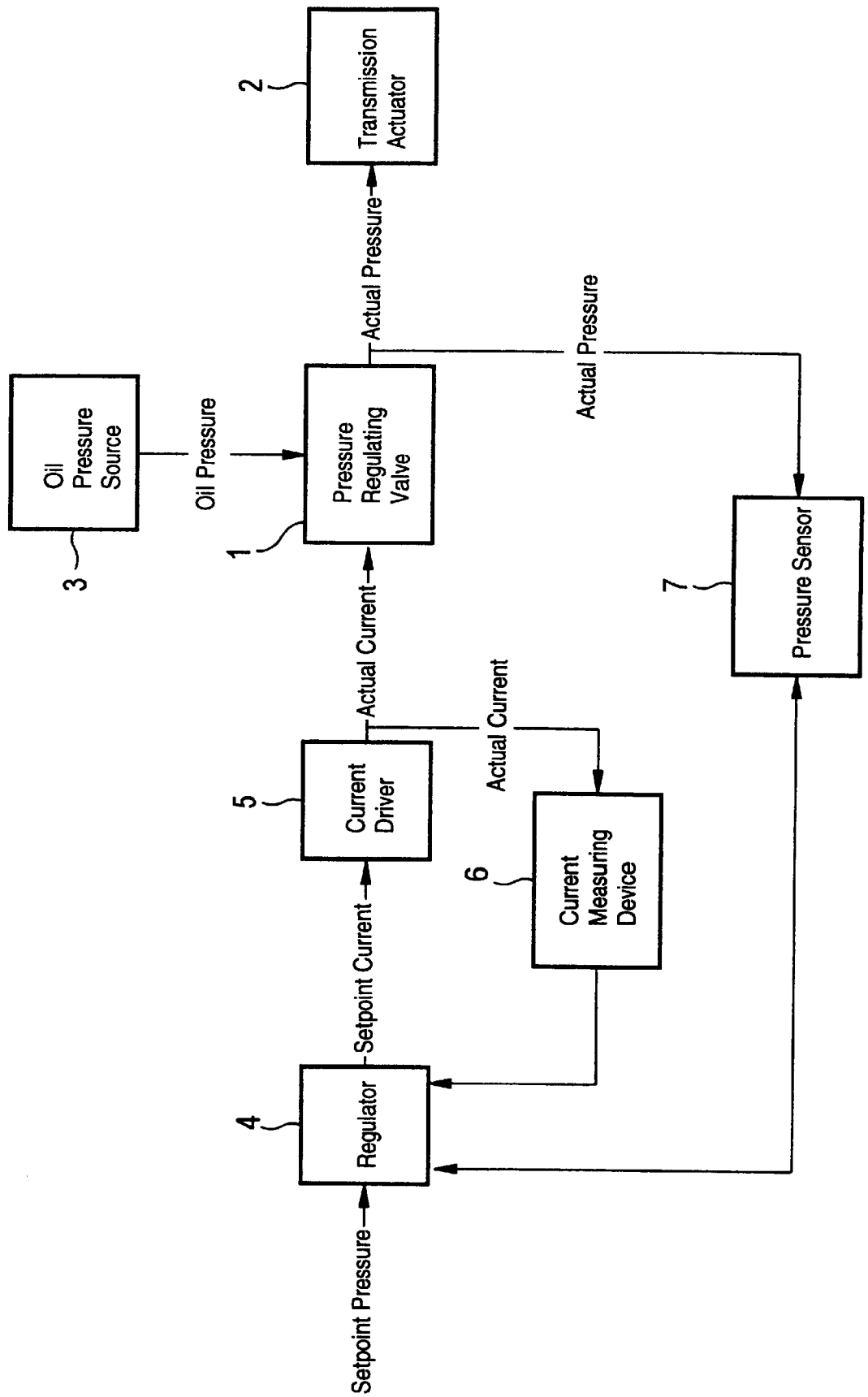

METHOD FOR ELECTROHYDRAULICALLY CONTROLLING A MOTOR VEHICLE TRANSMISSION AND ELECTROHYDRAULIC CONTROLLER FOR A MOTOR VEHICLE TRANSMISSION

BACKGROUND OF THE INVENTION

Field of the Invention

The invention relates to a method for electrohydraulically controlling a motor vehicle transmission and to an electrohydraulic controller for a motor vehicle transmission.

In automatic or automated transmissions for motor vehicles, as well as conventional purely hydraulic controllers combined electronic-hydraulic systems—referred to below as electrohydraulic controllers—are also being increasingly used. In such systems, the hydraulics continue to actuate the power of the transmission actuators—clutches and brakes—while the selection of the gears and transmission ratios and the adaptation of the pressures to the torque to be transmitted is performed by the electronics. The interface between the electronics and hydraulics is usually formed by electrohydraulic transducers, such as electrically actuated proportional pressure regulating valves or servo valves, which convert an impressed control current into an activation pressure, proportional thereto, for an assigned transmission actuator. In order to set with sufficient precision the activation pressure that is necessary for a requested torque, it is necessary to feed back the pressure originating from the electrically actuated pressure regulating valve or the control current that is impressed into the electrically actuated pressure valve. In this way, a closed control circuit is implemented. In this context, stringent requirements are made of the resolution of the fed-back activation pressure or control current, in particular in the low pressure or torque ranges.

When the control current of the electrically actuated pressure regulating valve is fed back, it is possible to make a measurement of the current during which the results lie in a narrow tolerance range which permits the requested resolutions and degrees of precision only by using complex and high-quality, but also expensive, electronics. The activation pressure of the pressure regulating valve can reliably be fed back with the requested precision only by using high-quality and thus expensive pressure sensors in conjunction with correspondingly complex evaluation electronics.

A further possible way of achieving the necessary resolution is to use electronically actuated pressure regulating valves in what is referred to as a "dual gain" configuration. Such "dual gain" pressure regulating valves have two electro-mechanical transducers per valve, and the necessary resolution can be achieved by two or more regulated driver stages. However, such a solution is also associated with high costs.

SUMMARY OF THE INVENTION

It is accordingly an object of the invention to provide a method for electrohydraulically controlling a motor vehicle transmission and a electrohydraulic controller for a motor vehicle transmission which overcome the above-mentioned disadvantages of the prior art methods and devices of this general type, in which the activation pressure of the transmission actuators, and thus of the torques to be set, can be reliably regulated in a precise way with a low level of complexity and at low cost.

With the foregoing and other objects in view there is provided, in accordance with the invention, a method for electrohydraulically controlling a motor vehicle transmission. The method includes the steps of using a pressure regulating valve to convert a control current into an activation pressure for a transmission actuator, feeding back the control current and the activation pressure at a given time to a regulator, and using the regulator to convert a setpoint value for the activation pressure of the transmission actuator into the control current. The conversion is dependent on the control current at the given time and/or the activation pressure at the given time.

The pressure regulating valve converts the control current into the activation pressure for a transmission actuator, for example a clutch or a brake. According to the invention, both the control current at a given time is fed back to the regulator via the current measuring device and the activation pressure at the given time is fed back the a regulator via a pressure sensor. The regulator converts a setpoint value for the activation pressure of the transmission actuator, which characterizes a torque to be transmitted by the actuator—referred to below as an actuator torque—into the control current as a function of the fed-back control current and/or of the fed-back activation pressure. In one advantageous embodiment, the current measuring device is adjusted here in such a way that a high resolution of the measurement results is obtained in a partial range of the actuator torque. In the partial range, the setpoint value for the activation pressure is converted into the control current for the pressure regulating valve in dependence on the fed-back control current. However, given linear adjustment of the current measuring device, reasonable measurement results are no longer supplied outside the partial range. It is therefore decisive to switch over in good time, before the partial range limits are reached, to a conversion of the setpoint pressure that is dependent on the fed-back activation pressure. For this purpose, the regulator advantageously evaluates a variable which characterizes the actuator torque to be transmitted, and when there is upward or downward transgression of predefined threshold values the system is switched over from conversion of the setpoint pressure as a function of control current to the conversion as a function of the activation pressure. The implementation possibilities for the necessary threshold value comparison are very numerous here. For example, the fed-back control current and the fed-back activation pressure can serve as reference variables.

It is particularly advantageous here that the controller according to the invention merely requires a conventional current measuring device and a conventional pressure sensor. In both components, no particular requirements are made of the resolution over a wide measuring range so that cost-effective standard systems can be used. The pressure sensor used can advantageously also be utilized for monitoring purposes.

With the foregoing and other objects in view there is additionally provided, in accordance with the invention, an electrohydraulic controller for a motor vehicle transmission The electrohydraulic controller contains a pressure regulating valve for converting a control current into an activation pressure for a transmission actuator, and a regulator for converting a setpoint value for the activation pressure into the control current in dependence on the control current at a given time and/or the activation pressure at the given time. A current measuring device is connected between the regulator and the pressure regulating valve. The current measuring device feeds back the control current at the given time to the regulator. A pressure sensor is connected between the regulator and the pressure regulating valve, the pressure sensor feeds back the activation pressure at the given time to the regulator.

In accordance with an added feature of the invention, the current measuring device is adjusted such that a high resolution of a measurement result is ensured in a partial range of an actuator torque to be transmitted.

Other features which are considered as characteristic for the invention are set forth in the appended claims.

Although the invention is illustrated and described herein as embodied in a method for electrohydraulically controlling a motor vehicle transmission and a electrohydraulic controller for a motor vehicle transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block circuit diagram of an electrohydraulic controller according to the invention for a motor vehicle transmission.

DESCRIPTION OF THE PREFERRED EMBODIMENT

Referring now to the single FIGURE of the drawing in detail, there is shown an electrically actuated proportional pressure regulating valve 1 that converts an impressed control current (actual_current) into an activation pressure (actual_pressure) which is proportional thereto for a transmission actuator 2, for example a clutch or a brake. The electrically actuated pressure regulating valve 1 is, for this purpose, connected to an oil pressure source 3, for example a pump. In the field of motor vehicles, oil is the most frequently used pressure medium, but the invention is in no way restricted to this pressure medium.

A setpoint value of the activation pressure (setpoint pressure) is fed to a regulator 4 from a non-illustrated superordinate control device, for example a transmission controller, and is converted into a control current setpoint value (setpoint_current). The control current setpoint value (setpoint_current) is amplified by a current driver 5 to the control current value (actual_current) which is necessary for the electrically actuated pressure regulating valve 1. The current driver 5 can, however, also be integrated into the regulator 4. The control current (actual_current) at a given time of the pressure regulating valve 1 is fed back to the regulator 4 via a current measuring device 6, for example using a shunt resistor. The activation pressure at the given time (actual_pressure) of the transmission actuator 2 is likewise fed back to the regulator 4 via a pressure sensor 7. In this way, a closed control circuit with two parallel feedback circuits is obtained.

The current measuring device 6 is adjusted here in such a way that in low torque ranges, for example in the range up to 30 Nm, and at correspondingly low current values, for example up to 100 mA, a high resolution of the measurement results is available. However, for a linear adjustment this results in the circuit overflowing for relatively high current and torque ranges, and no sensible values of the control current being reported back to the regulator 4 anymore.

According to the invention, the control current for the pressure regulating valve 1 is determined as a function of the fed-back control current at the given time (actual_current) in a partial range of the actuator torque in which the measurement results of the current measuring device 6 have a high resolution. Outside the torque range, the control current for the pressure regulating valve 1 is determined as a function of the activation pressure at the given time (actual pressure) which is fed back via the pressure sensor 7.

The two measurement ranges in the regulator 4 can either be reconciled by a control device present in the regulator 4, for example by adaptations or compensation algorithms in a microcontroller, or by a standardization when the system is put into service.

For switching over, the regulator 4 advantageously evaluates a variable that characterizes the actuator torque to be transmitted, and when a predefined threshold value is exceeded the system is switched over from the conversion of the setpoint pressure (setpoint_pressure) as a function of the control current to the conversion as a function of the activation or actual pressure. The implementation possibilities for the necessary threshold value comparison are very varied here. Both the fed-back control current (actual current) and the fed-back activation pressure (actual pressure) can thus be used as reference variables. However, because adjustment of the current measuring device 6 in the form described during linear adjustment inevitably leads to the measuring device reaching its overflow level in the relatively high torque or current range, and thus no longer supplying any reasonable measurement results, the decisive factor is merely to switch over in good time to the conversion of the setpoint pressure as a function of activation pressure before the overflow range is reached.

In an alternative embodiment, the current measuring device 6 is adjusted in such a way that a high resolution of the measurement results is available in high torque ranges, for example in the range starting from 30 Nm, and at correspondingly high current values, for example starting from 100 mA. The control current is correspondingly determined as a function of the fed-back activation pressure (actual pressure) in the low torque range below a predefined threshold value, and as a function of the fed-back control current (actual_current) in the high torque range above the predefined threshold value.

In a further embodiment, the control current is determined as a function of the fed-back control current (actual_current) and of the fed-back activation pressure (actual_pressure) at least in a partial range of the actuator torque to be transmitted. For this purpose, for example a status observer in the form of a Kalman filter can be used, which permits parallel processing of both input variables.

The parallel feeding back of the control current and of the activation pressure can also be advantageously used in the case of malfunctions in one of the two feedback circuits. If, for example, a failure or a malfunction during the feeding back of the control current (actual_current) is detected in the regulator 4, for example by a plausibility check, it is also possible to switch over to conversion of the setpoint pressure (setpoint_pressure) as a function of the activation pressure (actual_pressure) even within the partial range in which the setpoint pressure (setpoint_pressure) is normally converted as a function of the fed-back control current (actual_current). In this way, an additional protection against faults is implemented in a simple way.

I claim:

1. A method for electrohydraulically controlling a motor vehicle transmission, which comprises the steps of:
   using a pressure regulating valve to convert a control current into an activation pressure for a transmission actuator; feeding back the control current and the activation pressure at a given time to a regulator; and
   using the regulator to convert a setpoint value for the activation pressure of the transmission actuator into the control current, a conversion being dependent on at least one of the control current at the given time and the activation pressure at the given time.

2. The method according to claim 1, wherein a conversion of the setpoint value for the activation pressure into the control current in a partial range of an actuator torque to be transmitted is dependent on the control current at the given time and is dependent on the activation pressure at the given time.

3. The method according to claim 2, which comprises using the regulator for converting the setpoint value for the activation pressure of the transmission actuator into the control current in dependence on the control current at the given time if a variable which characterizes the actuator torque to be transmitted lies below a predefined threshold value, and in dependence on the activation pressure at the given time if a variable which characterizes the actuator torque to be transmitted lies above the predefined threshold value.

4. The method according to claim 2, which comprises converting the setpoint value for the activation pressure of the transmission actuator in the regulator into the control current in dependence on the control current at the given time if a variable which characterizes the actuator torque to be transmitted lies above a predefined threshold value, and in dependence on the activation pressure at the given time if the variable which characterizes the actuator torque to be transmitted lies below the predefined threshold value.

5. An electrohydraulic controller for a motor vehicle transmission, comprising:
   a pressure regulating valve for converting a control current into an activation pressure for a transmission actuator;
   a regulator for converting a setpoint value for the activation pressure into the control current in dependence on one of the control current at a given time and the activation pressure at the given time;
   a current measuring device connected between said regulator and said pressure regulating valve, said current measuring device feeding back the control current at the given time to said regulator; and
   a pressure sensor connected between said regulator and said pressure regulating valve, said pressure sensor feeding back the activation pressure at the given time to said regulator.

6. The controller according to claim 5, wherein said current measuring device is adjusted such that a high resolution of a measurement result is ensured in a partial range of an actuator torque to be transmitted.

* * * * *